United States Patent [19]

Chapman

[11] 4,256,138

[45] Mar. 17, 1981

[54] PRE-SET FLUID PRESSURE REGULATOR

[76] Inventor: Ernest M. Chapman, Rte. #1, Box 349P, Springfield, Vt. 05156

[21] Appl. No.: 120,032

[22] Filed: Feb. 11, 1980

[51] Int. Cl.³ ............................................. F16K 31/12
[52] U.S. Cl. ........................... 137/505.42; 137/505.39
[58] Field of Search ..................... 137/505.25, 505.38, 137/505.39, 505.42

[56] References Cited

U.S. PATENT DOCUMENTS

| | | | |
|---|---|---|---|
| 2,615,287 | 10/1952 | Senesky | 137/505.42 |
| 3,044,486 | 7/1962 | Miller | 137/505.42 |
| 3,319,649 | 5/1967 | Cummins | 137/505.42 X |
| 3,352,456 | 11/1967 | Swineford | 137/505.42 X |

*Primary Examiner*—Harold W. Weakley

*Attorney, Agent, or Firm*—Sughrue, Rothwell, Mion, Zinn and Macpeak

[57] ABSTRACT

A metal regulator body is provided with a longitudinal bore, within which a tubular adjustor is threadably mounted for axial movement within the bore. A tire valve is threadably and sealably mounted within the tubular adjustor at one end thereof, and an expandable and contractable bellows is sealably fixed to the regulator body concentric with the tubular adjustor with the end of the bellows in abutment with one end of the tire valve stem. High pressure acetylene gas or the like from a supply tank feeds through the tire valve via the bellows to an outlet on the opposite side of the tire valve. The bellows on sensing a pressure above the pre-set value for the regulator instantly extending, causing the tire valve stem to follow the extension to limit the pressure of the available acetylene gas.

4 Claims, 3 Drawing Figures

PRE-SET FLUID PRESSURE REGULATOR

FIELD OF THE INVENTION

This invention relates to fluid pressure regulators, and more particularly, to an improved pre-set acetylene pressure regulator which is virtually leak-free.

BACKGROUND OF THE INVENTION

Acetylene gas is a chemical compound $C_2H_2$ which may, under pressure, decompose with explosive force, tending to disassociate violently into its constituents. This may be effected by ignition or by shock. Acetylene is usually maintained in a steel tank which has a cement filler of a porous charcoal monolithus or calcium silicate. Such filler is saturated with acetone, in which the acetylene actually dissolves. There is a requirement that the cement filler be absent void where free acetylene in gaseous form can collect. In volumes of over one cubic foot at pressures of over 30 psi, free acetylene can explode from shock only, no fire being required. Thus, acetylene must be contained in a cement lined cylinder and used at pressures below 30 psi. It may be stored in such cylinders at 250 psi, at 70° F. A fusible plug is used with a melting temperature of 212° F. for protection in the event of high temperature, fire and the like. 15 psi gauge pressure has been found to be a safe working limit for use. Therefore, there is a need for a pressure regulator to reduce the pressure from tank pressure to a lower gauge pressure such as 15 psi to permit safe use of acetylene gas.

Acetylene is a non-toxic gas and has been used as an anesthetic, but can cause asphixiation in a confined area without breathing air of at least 18% oxygen. It takes between 2.5 and 81% by volume of air to ignite. Ignition can be effected by low energy spark. The acetylene has an etheral garlic-like smell and can cause dizziness, unconsciousness or even death. Therefore, the equipment associated with the storage and transmission and use of acetylene must be leakproof. If acetylene is withdrawn from its tank at a rate in excess of 1/7 cylinder capacity per hour, protective acetone may exude from the cylinder, thus reducing its protection. Under certain conditions, acetylene forms readily explosive compounds with copper, silver and mercury. Therefore, contact with these metals, their salts, compounds and high concentration alloys must be avoided. Contact with highly caustic salts or solutions or contact with other materials corrosive to copper or copper alloys can render otherwise acceptable alloys unsatisfactory. The presence of moisture, certain acids or alkaline materials tends to enhance the formation of the dangerous acetylides.

In normal use, acetylene gas is supplied from steel tanks provided with proper on/off valves per standards of the Compressed Gas Association (CGA) and of proper size and style for the gas being used. Pressure regulators have been developed in an attempt to meet these standards and to provide a pressure regulator which is both leakproof and compatible to the gas. One such pressure regulator is the subject matter of U.S. Pat. No. 3,972,346 to Alex F. Wormser issuing Aug. 3, 1976. That pressure regulator is constituted by a valve body bearing a longitudinal bore within which is threadably positioned a tire valve bearing centrally a spring biased tire valve center pin or stem which selectively permits or closes off the flow of fluids through the valve structure with the valve being positioned intermediate of a gas inlet and a gas outlet. The end of the valve stem projects axially of the tire valve casing and a cup-shaped slide is carried by the valve body and spring biased by a compression spring, these elements being located within a regulator body chamber on the outlet side of the regulator, and wherein the gas pressure within the regulator chamber acts oppositely to move the slide and the compression spring in a direction tending to close the valve, while acting on the valve stem member tending to maintain the tire valve in open position.

The pressure regulator of U.S. Pat. No. 3,972,346 advantageously employs a tire valve as a single valve element between the tank or supply side and the outlet. However, the regulator is complicated and costly due to the nature of the slide, the compression spring, and the necessary seal between the axially shiftable slide and the fixed valve casing. Such a regulator in employing a slide and other similar regulator employing pistons or diaphragms have great difficulty with leakage and require the use of O or quad rings or lip seals, which require gas pressure to make them effective. The seals which deteriorate over time, permit small leaks to exist. Further, such regulators as that of U.S. Pat. No. 3,972,346, even when leak-free at the time of manufacture, can develop leaks from surface damage, poor material selection and from effects of aging and non-compatibility of materials.

It is, therefore, a primary object of this invention to provide an improved gas pressure regulator, more particularly for acetylene gas regulation which is of simplified construction, low cost, is devoid of main pressure control slides, requires no sealing rings or special seals and no diaphragm and has no separate springs for pressure balance, which is leak-proof and which is formed of materials which will not react with acetylene gas.

It is a further object of this invention to provide an improved pre-set gas pressure regulator which employs a tire valve as a singular valve for reducing pressure from the inlet to outlet passage, and wherein tire valve opening pressure is pre-set and operation is controlled by a leakproof metal bellows which acts as a spring both in extension and compression and which instantly closes the valve to any pressure above the pre-set value.

SUMMARY OF THE INVENTION

The present invention constitutes an improved fluid pressure regulator comprising a regulator body provided with a longitudinal bore within which is mounted a tubular adjustor sealed to the regulator body but axially movable. In turn, a tire valve is threadably and sealably mounted within said tubular adjustor at one end thereof. The regulator body bears a fluid inlet passage for transmitting fluid under pressure to said valve at a first pressure and the regulator body further includes a fluid outlet passage for transmitting fluid from said valve at a second, lower pressure. An expandable and contractable bellows is sealably mounted to said body and concentrically surrounds said tubular adjustor at said one end bearing said tire valve. The tire valve includes a tire valve stem which projects axially for contact with the end of the bellows such that by axially shifting the adjustor, the end of the valve stem forces the end of the bellows to extend to pre-set the regulator valve.

The bellows may be of cup-shaped configuration with its bottom contacting the end of the valve stem, and a rigid cover may be borne by the valve body, said cover including an end wall extending across the end of the bellows and spaced axially therefrom, to limit the expansion of the bellows and prevent its rupture if overpressured. Preferably, the adjustor is threaded to the bore of the regulator body and is rotatable by way of a screw driver slot to cause the adjustor to threadably shift axially within the body bore to effect presetting of the outlet pressure of the regulator.

DESCRIPTION OF THE PREFERRED EMBODIMENT

Figure 1:
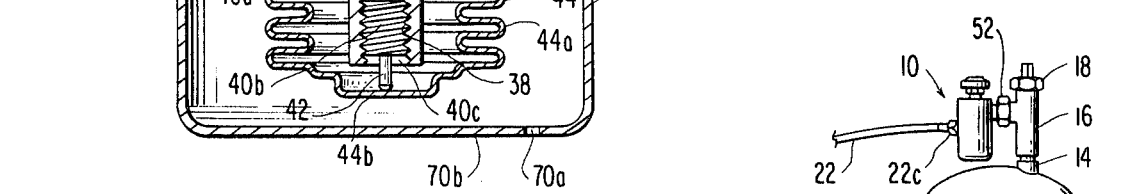
FIG. 1 is a side elevational view of the improved fluid pressure regulator of the present invention, as applied to an acetylene tank for regulating the supply of acetylene gas to an end use device (not shown).

The improved pressure regulator of the present invention, particularly useful in the regulation of acetylene gas, is shown in FIG. 1 generally at 10 connected to a supply tank 12 bearing a gas under pressure such as acetylene, which gas is permitted to escape through tank outlet 14 under control by way of an on/off valve 16, the on/off valve 16 including a shut-off or control member 18 at the top thereof, and bearing an outlet tee at 20, permitting threaded connection to the improved fluid pressure regulator 10 of the present invention. The pressure regulator 10, therefore, functions to provide acetylene gas (or other gas from a source or supply) to an end use device by way of a supply hose as at 22, FIG. 1.

Figure 2:
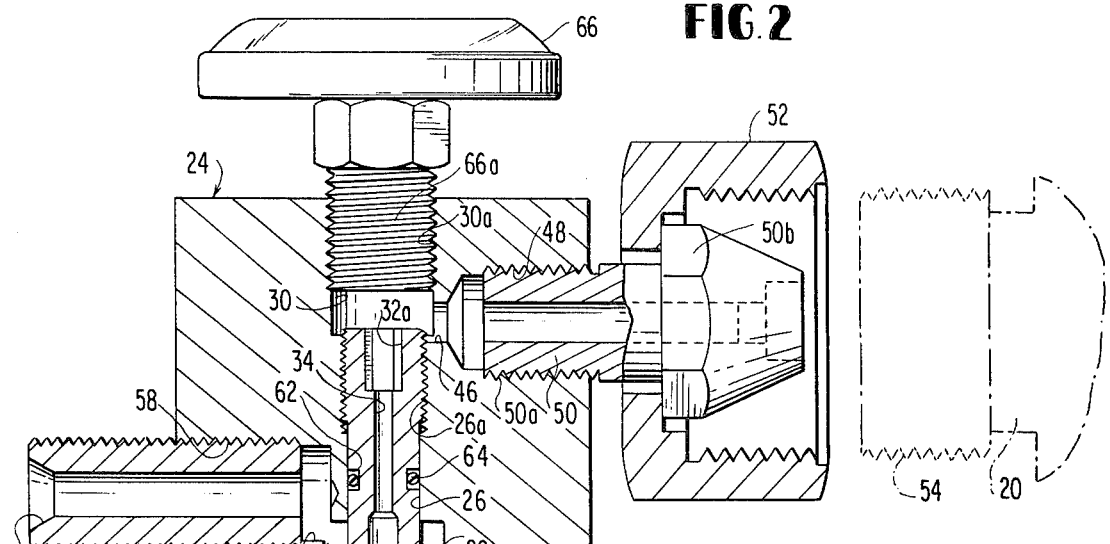
FIG. 2 is an enlarged, vertical sectional view of the improved fluid pressure regulator illustrated in FIG. 1.
Figure 3:
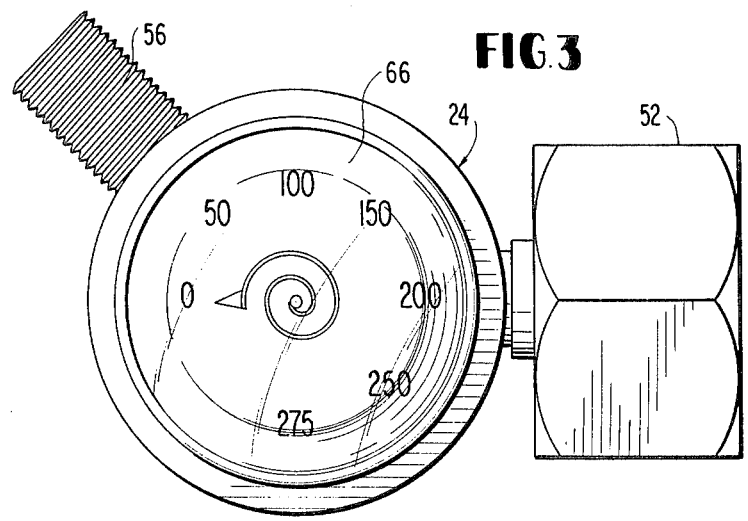
FIG. 3 is a top plan view of the improved fluid pressure regulator of FIG. 2.

Turning to FIGS. 2 and 3, the improved pre-set gas pressure regulator 10 is formed of a regulator body 24 which is cylindrical in form, preferably formed of steel and therefore compatible with the acetylene of tank 12 and tire valve materials of a tire valve (to be employed as a major element thereof), the body 24 being of rustproof outside finish. Body 24 is cylindrical in form, vertically axially oriented, and provided with a bore 26, that bore 26 being counterbored at 28 and 30 at its vertically upper and lower ends (in the orientation shown in FIG. 2). The upper end of bore 26 is tapped and threaded as at 26a, and the upper end of the counterbore 30 is tapped and threaded at 30a. The bore 26 and the counterbore 30 receive a tubular metal adjustor 32 which also may be formed of stainless steel. Adjustor 32 is machined such that it is provided with a bore at 34, a first counterbore 36, and a second counterbore which is further tapped and threaded at 38 at one end and which connects to counterbore 36 by way of a tapered section forming a tapered valve seat 40. The adjustor 32 bears as a singular pressure control element, a tire valve indicated generally at 40. The tire valve 40 is conventional. However, the type must be selected for use with acetylene. The tire valve includes a machined outer seat for sealing the outside of a barrel 40a, that is, tapered portion of the barrel 40a is formed of a compressible synthetic material to sealably close off and prevent any gas passing about the exterior of the valve barrel 40a, thus bypassing the valve interior leading from its high pressure inlet end 40b to its low pressure outlet end 40c. The tire valve may be of the type provided by Bridgeport Tire Valves and Accessories such as a Type A Bridgeport Tire Valve.

The valve barrel is provided with external threads at portion 40d to maintain the tire valve in axial threaded and sealed position within threaded counterbore portion 38 of the adjustor 32. A cup seal 42a integral with the valve stem or valve center pin 42 is held adjacent the lip 40e of the hollow barrel by a compression spring (not shown), the cup seal 42a being an integral element of the valve stem or center pin 42 of tire valve 40. A cup seal 42a is maintained against the lip 40e of the hollow barrel 40a of the tire valve by a compression spring (not shown), thus cutting off passage of pressurized gas from inlet end 40b through this valve to the outlet end 40c.

In FIG. 2, the valve is shown in open position with the cup seal 42a raised above the lip 40e. It is the depression of the headed stem 42 which causes the lip seal to open with the total amount of depression of the stem dictating the pressure drop across the passage defined by the cup seal 42a and the lip 40e. Care must be exercised when selecting the tire valve to be employed, if the regulator is to be employed in regulating acetylene gas, since valves with brass or copper content of over 67% will be catalysts capable of explosion, while alternatively if aluminum bodies are provided, electrolysis may occur, causing valve malfunctions even if anodized.

A further major element of the regulator of the present invention comprises a thin sheet metal bellows 44, being of cup-shaped configuration, formed of stainless steel or the like and including an annular sidewall 44a and an end wall 44b sealed thereto, the bellows being open at its opposite end at 44c, which end is fixedly and sealably attached to an annular projecting portion 24a of the regulator body 24. The bellows 44 may be brazed, welded, soldered, crimped or adhesively attached to the body 24 in a leakproof manner. The bellows 44 takes the form, therefore, of a hollow tube with a corrugated wall, although the form illustrated has a closed end, an alternative form may have both ends open with the end underlying valve stem 42 bearing a plug so as to close off that end of the bellows. The bellows 44 is provided with a compression spring action being able to return to its relaxed axial state by ambient pressure and likewise being extended as an extension spring by internal gas pressure with reduction or release of internal gas pressure likewise returning the bellows again to its relaxed position.

The pre-set gas pressure regulator of the present invention is provided with means for coupling the regulator to a tank of gas under high pressure as well as a means for delivering a lower pressure on the downstream side of the tire valve 40 at a reduced pressure to an end use device. In this respect, the valve body 24 is provided with a pair of transverse or lateral bores, the first at 46 which is counterbored at 48. Counterbore 48 is tapped and threaded and receives a threaded supply tank connection nipple indicated generally at 50 of hollow tubular metal including an outer peripheral threaded portion 50a which sealably threads to the threaded counterbore 48 within body 24. As its opposite end, an enlarged hexagonal head bears an internally threaded, hollow nut 52, loosely mounted to bear threaded portion 50a, permitting sealed threaded connection to the threaded end 54 of the tee 20. The bore 46 opens to counterbore 30 within the body 24 at right angles thereto and forms an inlet passage to the tire valve inlet end 40b.

On the side of the valve body 24 opposite the tank connection or inlet 50, there is provided an outlet pipe 56 which is threadably borne by the valve body within a tapped and threaded counterbore 58 which opens radially outwards of bore 60. Bore 60 intersects counterbore 36 to define an outlet passage leading from the interior of the bellows 44.

Preferably, to insure that no gas is lost between bore 26 and the adjustor 32, the adjustor 32 is provided with an annular groove 62 on its outer periphery intermediate of its ends, the groove 62 bearing an O-ring seal 64 which is compressed between the adjustor 32 and the valve body 24 at that point. While a CGA fitting, for use with hoses particularly employed in acetylene use may comprise a ⅜ inch-24LH thread with a 60° mating internal profile 56b at one end, with a hexagonal hollow form fitting having a pipe threaded end for making attachment to the regulator, however in the present invention, an acceptable fitting at lesser expense consists of the hollow steel pipe 56 fully threaded along its length with a 33/8 24LH thread and being screwed into the tapped and threaded counterbore 58 of the valve body and permanently secured by suitable adhesive.

In order to regulate the outlet pressure, there is provided a screw driver hexagonal recess or hole 32a within the end of adjustor 32. Adjustor 32 is threadably shifted axially of body bore 36.

To protect the bellows from accidental damage, a thin cup-shaped metal cover 70 is permanently attached to the valve body 24. The valve body 24 is provided with a peripheral recess at 24b at its bottom, which recess receives the open end of the cup-shaped cover 70. That end of the cup-shaped cover is shown as being crimped to the valve body. However, this is not necessary. It may be adhesively attached or otherwise fixedly mounted to the valve body 24 at this point.

The cup 70 is provided within its transverse bottom 70b with a small vent hole as at 70a, preventing the outside of the bellows from being pressurized with the exception of atmospheric pressure. The cup-shaped cover 70 is axially dimensioned such that bottom 70b is at a predetermined distance normally from the end of the bellows when the bellows is at rest, so as to limit any damaging prestress due to an overextension of the bellows upon accidental overloading condition of excess internal gas pressure.

From the above, it is evident that in operation attachments made by way of nut 52 to the threaded portion 54 of tee 20, thereby connecting the pre-set gas pressure regulator 10 to the acetylene tank 12 (acetylene being the gas borne by tank 12 in this case), while further a hose as at 22 is connected by way of hose fitting 22a to threaded pipe 56 to supply acetylene gas to a torch or the like, as an end use device. The outlet pressure of the gas is adjusted by rotating adjustor 32 to axially displace the adjustor 32 and to increase or decrease the bias applied by the bellows 44 to the valve stem 42 normally maintaining the valve in an open state as shown in FIG. 2. The outlet pressure feeding the outlet 56 may be viewed as between values of zero and 275 psi, FIG. 3, by viewing the top of gauge 66 threaded to threaded bore 30a. The tire valve 40 continually monitors the pressure of the gas being used which is controlled by the leakproof metal bellows 44 acting as a spring both in extension and compression. The bellows 44 on sensing a pressure over that for which the regulator is pre-set extends the valve stem 42 following the expansion, thereby closing the valve at any pressure above the pre-set amount.

Further, from the above description, it is apparent that the improved pre-set gas pressure regulator may be manufactured from components which are readily commercially available or readily machinable. The assembly of those components may be effected by brazing of the bellows 44 to the finished body at annular projection 24a, the tire valve 40 is assembled to the adjustor 32 by threading to two inch pound torque. The O-ring 64 is applied to the adjustor recess or groove 62. Prior to assembling of the adjustor to the body 24, a test may be had of the sealing capability of the O-ring 64 as well as the seal between the barrel portion 40a and the adjustor threadably bearing the same.

By application of a non-hardening adhesive to the external threads of the adjustor 32, the adjustor 32 is threaded to the body at threaded bore portion 26a. By use of a special assembly fixture (pressurized on signal) and by use of a special adjusting key using precalibrated bleed orifice in a calibrated pressure gauge attached to the outlet pipe 56, by threading the subassembly adjustor axially into the body 24 until a proper gauge reading is achieved at outlet pipe 56, the pre-set pressure for bellows 44 and tire valve 40 is effected. The fixture is then depressurized and the pre-set regulator is removed. At this point, a proper outlet nipple which includes a porous filter and proper nut using Locktite pipe sealant may be effected, there being the requirement that the nut on the outlet nipple remain free. The pre-set acetylene pressure regulator is then ready for shipment in commercial use.

The improved gas pressure regulator of the present invention may be employed for maintaining a predetermined pressure drop from a supply tank to an end use device for many gases other than acetylene. However, if acetylene or other gases which may react violently with the elements forming the regulator or with the atmosphere in which the gas is employed, precautions must be taken in the structural make up of the regulator along the lines discussed previously within the specification.

While the invention has been particularly shown and described with reference to a preferred embodiment thereof, it will be understood by those skilled in the art that various changes in form and details may be made therein without departing from the spirit and scope of the invention.

What is claimed is:

1. An improved pre-set fluid pressure regulator comprising:
   a regulator body,
   a longitudinal bore within said body,
   a tubular adjustor,
   means for sealably mounting said adjustor within said bore for axial adjustment,
   a tire valve sealably mounted within said tubular adjustor at one end thereof,
   a fluid inlet passage for transmitting said fluid to said valve at a first pressure,
   a fluid outlet passage for transmitting said fluid from said valve at a second, lower pressure,
   an expandable and contractable closed bellows sealably fixed to said regulator body concentric with said adjustor and said tire valve and having one end spanning across the end of said tire valve, said tire valve bearing an axially displaceable valve stem with the end of said tire valve stem projecting axially beyond the end of said tubular adjustor and contacting the end of said bellows, and means for connecting said outlet passage to the interior of said bellows, said tire valve being between said fluid inlet passage and said fluid outlet passage and acting in a continuing fashion to reduce said first pressure to said second pressure, such that axial adjustment of said adjustor functions to variably pre-set the outlet pressure for said regulator.

2. The fluid pressure regulator as claimed in claim 1, wherein said valve body bore comprises a threaded portion and said tubular adjustor is threaded on its outer periphery over a portion of its length and is threadably carried by said regulator body and wherein said tubular adjustor further comprises means for receiving an actuating tool to threadably rotate said actuator about its axis in the regulator body so as to variably axially position said adjustor relative to said bore and to vary the compressive force acting on said valve stem by said bellows.

3. The fluid pressure regulator as claimed in claim 2, further comprising a peripheral groove within said tubular adjustor on its outer periphery and an O-ring positioned within said groove and sealing said adjustor and said body such that fluid pressure is prevented from escaping between the periphery of said adjustor and said bore carrying the same between said high pressure inlet and said lower pressure outlet.

4. The fluid pressure regulator as claimed in claim 1, further comprising a cup-shaped cover fixed at its open end to said regulator body and concentrically surrounding said bellows and being spaced from said bellows by a predetermined axial distance such that the transverse end of said cup-shaped cover functions as a positive stop to limit expansion of said bellows and to prevent deformation of said bellows by overpressuring of the same.

* * * * *